Dec. 18, 1945. J. D. DILLEY 2,391,140
WASHER AND COTTER PIN LOCK
Filed Aug. 20, 1943
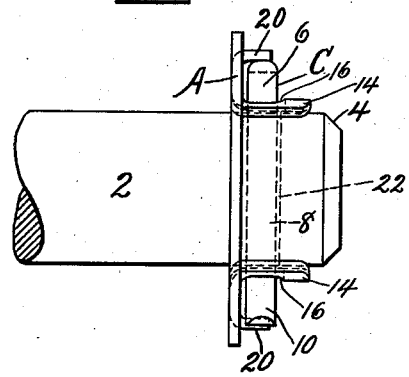
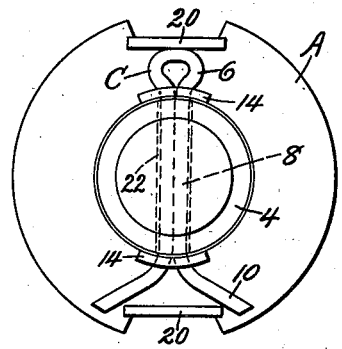
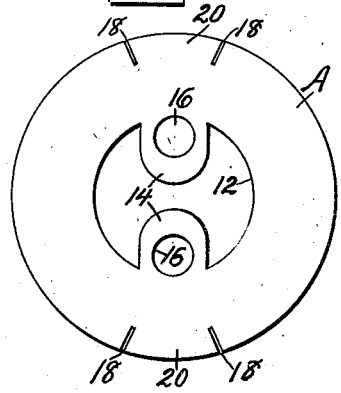
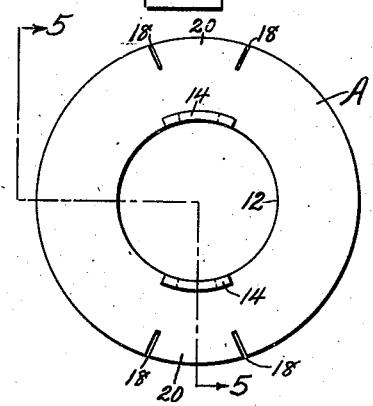
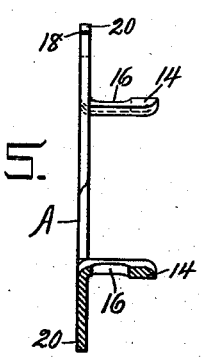
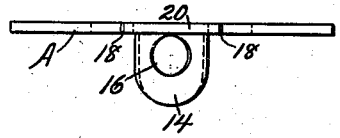
INVENTOR
June D. Dilley
BY
Robert A. Shields
ATTORNEY Patented Dec. 18, 1945

2,391,140

UNITED STATES PATENT OFFICE 2,391,140

WASHER AND COTTER PIN LOCK

June D. Dilley, Huntington, W. Va., assignor to American Car and Foundry Company, New York, N. Y., a corporation of New Jersey Application August 20, 1943, Serial No. 499,377

6 Claims. (Cl. 85—7)

This invention relates to a construction whereby a washer and a cotter pin mutually interact to lock each other relative to a rod, shaft or bolt.

Normally, washers and cotter pins when used together have been movable relative to each other with the result that there was excessive wear on the washer and cotter as well as wear of the shaft, rod or bolt through which the cotter extended. Breakage of any part of the cotter resulted in the loss of the cotter. It is an object, therefore, of the present invention to provide a special washer adapted to be locked against movement by a cotter and in turn lock the cotter against possible movement in either direction.

A further object of the invention is the provision of a washer and cotter pin having parts so arranged as to mutually interlock and prevent relative motion between the parts.

A still further object of the invention is the provision of a special washer which may be readily and cheaply formed for subsequent modification to mutually interlock with a cotter pin.

These and other objects of the invention will be apparent to persons skilled in the art from a study of the following description and accompanying drawing, in which Figure 1 is a side view of the improved washer when in mutual interlocking engagement with a cotter pin;

Fig. 2 is an end view of the construction;

Fig. 3 is a view of the washer as stamped from a flat plate;

Fig. 4 is a similar view showing the washer in condition for application to a shaft, rod or bolt;

Fig. 5 is a partial side and partial sectional view taken substantially on line 5—5 of Fig. 4, and Fig. 6 is a plan view of the washer as shown in Fig. 4.

Referring now to the drawing in detail, it will be seen that the washer A and cotter pin C have been applied to and are shown as mounted on a shaft, rod or bolt 2 which may be any part of a machine or structure to which it is desired to apply a cotter and a washer. As shown, the rod, shaft or bolt 2 has the outer end tapered slightly as at 4 but this is in nowise necessary. The cotter pin C is of more or less conventional form being constructed of half round wire bent to form a head 6 and an original parallel shank portion 8, the ends of which may be deflected as at 10 in any desired manner. The washer is preferably stamped or otherwise formed from a blank of sheet metal and after stamping will be of the form as shown in Fig. 3. As shown in this figure the washer A when flat is of circular form and has a dumbbell shaped central opening 12 formed therein, thereby providing tabs or ears 14, each of which is formed with substantially circular openings 16. Short notches 18 are formed in and interrupt the periphery of the washer to provide short external tabs or ears 20 for a purpose later to be described. For packing purposes the washers may be shipped in the flat as stamped and as shown in Fig. 3 or they may be placed in the form shown in Fig. 4. As shown in Fig. 4, a circular tool has been forced through the central opening of the blank shown in Fig. 3, with the result that the inner tabs or ears 14 have been deflected to a position substantially normal to the plane of the main body portion of the washer. The position of these tabs or ears is also clearly shown in Figs. 5 and 6 and it will be seen that the dumbbell shaped opening of the rough blank of Fig. 3 has become a circular opening with the tabs or ears 14 positioned adjacent the periphery thereof.

With the washer in the condition as shown in Figs. 4, 5 and 6 it may be readily slipped over the end of the rod, shaft or bolt 2 and rotated until holes 16 are in alignment with a hole 22 formed in a rod, shaft or bolt. After the holes 16 are roughly in alignment with holes 22, the cotter C may be driven into position and the ends deflected as at 10. Following insertion and spreading of the cotter the external tabs 20 may be struck with a hammer or otherwise bent so that one external tab overlies and contacts the head 6 of the cotter as clearly shown in Figs. 1 and 2. The other external tab is similarly bent so as to be positioned between the deflected ends 10 of the cotter. In this way it will be seen that the one external tab tightly engages the head 6 of the cotter, while the other external tab is engaged between the spread ends thereof. Further, it will be seen that the external tab located between the spread ends of the cotter will, due to the tapered ends, engage and prevent any possible rotation of the cotter relative to the washer even though one spread end 10 should be broken off. It will also be seen that even if both spread ends of the cotter are broken off, still the cotter cannot be lost due to the tab engaging the head portion. Again, even if the head portion is broken off the shank part of the cotter will still be effective for it will be retained by the spread ends 10 engaging the tab positioned therebetween. Likewise, even if both the head and spread portions are broken away, it is still impossible for the shank portion of the cotter to be lost for they would then drop and engage one of the bent external tabs 20. Since the cotter extends through holes 16 there can be no relative motion between the cotter and washer and since the external tabs engage both end portions of the cotter, the cotter cannot move relative to the washer. In other words, the cotter and washer after deformation mutually interlock to prevent relative motion therebetween. As previously stated, it may be desirable in some cases to ship the washers flat or in the condition shown in Fig. 3 rather than in the condition of Fig. 4. In cases where the washers are shipped flat they may be readily deformed to a condition similar to that shown in Fig. 4 by merely driving the washer onto the end of the rod, shaft or bolt 2 and in such cases it is advantageous if the rod, shaft or bolt is formed with the beveled end 4 indicated in Figs. 1 and 2.

While the construction and formation of the special washer has been described more or less in detail, it will be obvious to persons skilled in the art that various modifications and rearrangements of parts may be made without departing from the scope of the invention as defined by the appended claims.

What is claimed is:

1. The combination with a member having a transverse opening therethrough, a cotter pin in the opening and having a head portion and a shank portion with spread ends, and a washer carried by said member and locked thereon by said cotter pin, said washer being formed with portions engaging the head and spread shank portions of the cotter pin to thereby lock the cotter pin against longitudinal movement in either direction within said opening.

2. The combination with a member having a transverse opening therethrough, a washer carried by said member, tabs formed on said washer and engaging said member and having openings therethrough substantially in alignment with the openings in said member, a cotter pin extending through all of said openings, and an additional tab formed on said washer and overlapping and engaging the head end of said cotter pin.

3. The combination with a member having a transverse opening therethrough, a washer carried by said member, tabs formed on said washer adjacent said member and having openings therethrough located substantially in alignment with the openings in said member, a cotter pin having a shank portion extending through all of said openings and a head portion and spread end portions beyond the ends of said openings, and additional tabs formed on said washer adjacent the perimeter thereof and adapted to engage said head portion and spread end portions of the cotter pin.

4. The combination with a member having a transverse opening therethrough, a washer carried by said member, tabs formed on said washer adjacent said member and having openings therethrough located substantially in alignment with the openings in said member, a cotter pin having a shank portion extending through all of said openings and a head portion and spread end portions beyond the ends of said openings, and additional tabs formed on said washer adjacent the perimeter thereof, one of said additional tabs being adapted to engage the end of said head and another of the additional tabs being engageable between the spread ends of said cotter pin shank.

5. The combination with a member having a transverse opening therethrough, a washer carried by said member, tabs formed on said washer adjacent said member and having openings therethrough located substantially in alignment with the openings in said member, a cotter pin having a shank portion extending through all of said openings and a head portion and spread end portions beyond the ends of said openings, and additional tabs formed on said washer adjacent the perimeter thereof, one of said additional tabs being adapted to engage the end of said head and another of the additional tabs being engageable between the spread ends of said cotter pin shank, said last named additional tab having the side edges thereof converging inwardly toward the washer to thereby prevent rotation of the spread ends of the cotter shank relative to said openings.

6. As an article of manufacture a cotter locking washer comprising, a main body portion having an opening therethrough, tabs projecting laterally of said main body portion adjacent said opening and having cotter pin receiving holes extending therethrough with their axes substantially in alignment and parallel to the main body portion, and substantially radially extending notches cut in the perimeter of said washer to provide additional tab material therebetween, said material between certain of the adjacent notches being deflectable to provide additional tabs projecting laterally of the main body portion in spaced substantial parallelism with said first named tabs.

JUNE D. DILLEY.